United States Patent [19]

Matzner et al.

[11] Patent Number: 5,066,767
[45] Date of Patent: Nov. 19, 1991

[54] WHOLLY AROMATIC POLYESTERS COMPRISING ISOPHTHALIC ACID, TEREPHTHALIC ACID, P-HYDROXYBENZOIC ACID, HYDROQUINONE AND AN ARYLENE DIOL

[75] Inventors: Markus Matzner, Edison, N.J.;
Richard Layton, Augusta, Ga.

[73] Assignee: Amoco Corporation, Chicago, Ill.

[21] Appl. No.: 454,732

[22] Filed: Dec. 18, 1989

Related U.S. Application Data

[63] Continuation of Ser. No. 317,525, Mar. 1, 1989, abandoned.

[51] Int. Cl.$^5$ .................... C08G 63/02; C08G 63/18
[52] U.S. Cl. .................... 528/193; 528/176; 528/194
[58] Field of Search ............... 528/176, 191, 193, 194

[56] References Cited
FOREIGN PATENT DOCUMENTS
3629211 3/1988 Fed. Rep. of Germany .

*Primary Examiner*—John Kight, III
*Assistant Examiner*—T. Mosley
*Attorney, Agent, or Firm*—Matthew R. Hooper; William H. Magidson; Ralph C. Medhurst

[57] ABSTRACT

Wholly aromatic polyesters based on isophthalic acid, terephthalic acid, p-hydroxybenzoic acid, hydroquinone and an arylene diol, e.g. 4,4'-biphenol are described. The materials displayed are excellent overall combination of mechanical and thermal properties. Their melting points and heat distortion temperatures (264 psi) are at least about 260° C. and 260° C., respectively. These novel polymers can be melt-fabricated using standard injection molding, extrusion, and melt spinning techniques and yield fabricated articles with good surface characteristics.

11 Claims, No Drawings

WHOLLY AROMATIC POLYESTERS COMPRISING ISOPHTHALIC ACID, TEREPHTHALIC ACID, P-HYDROXYBENZOIC ACID, HYDROQUINONE AND AN ARYLENE DIOL

This is a continuation of application Ser. No. 317,525, filed Mar. 1, 1989, now abandoned.

FIELD OF THE INVENTION

Aromatic polyesters based on isophthalic acid, terephthalic acid, p-hydroxybenzoic acid, hydroquinone and an arylene diol are described. The five monomers are used in well specified proportions and yield polymers that display an excellent overall combination of mechanical and thermal properties. The subject copolyesters have melting points of at least about 260° C.; their heat distortion temperatures are at least about 200° C. The novel polymers can be melt-fabricated using standard injection molding, extrusion and melt spinning techniques.

BACKGROUND OF THE INVENTION

Wholly aromatic polyester resins have long been known. For instance, 4-hydroxybenzoic acid homopolymer and copolymers have been provided in the past and are commercially available. Such polymers are commonly crystalline in nature, relatively high melting or possess a decomposition temperature which is below the melting point, and when molten frequently exhibit orientation in the melt.

The homopolymer of p-hydroxybenzoic acid is a very high melting, insoluble material and, hence, very difficult to fabricate. Melting points as high as 610° C. were quoted-see W. J. Jackson, The British Polymer Journal, December 1980, p. 155. In order to depress the high melting point of the homopolymer so as to make it melt-fabricable, a variety of materials incorporating different types of comonomers were prepared over the years.

One such material is, for example, the resin made from p-hydroxybenzoic acid, isophthalic and/or terephthalic acids and 4,4′-biphenol as described in, for example, Cottis et al., U.S. Pat. Nos. 3,637,595 and 3,975,487. The polymer has outstanding high temperature properties; it can be molded to give articles of high modulus and strength. It is offered commercially by Amoco Performance Products, Inc. under the tradename of XYDAR.

A related class of wholly aromatic polyesters based on p-hydroxybenzoic acid, isophthalic and terephthalic acids, and hydroquinone is claimed in commonly assigned U.S. atent Application entitled "Hydroquinone Poly(IsoTerephthalates) Containing Residues of p-Hydroxybenzoic Acid", Ser. No. 07/255,670, filed in the name of R. Layton, on Oct. 11, 1988 is hereby incorporated by reference. The polymers described in the latter application display high modulus, and high strength; they have melting points in the range of from 340° C. to 400° C.; are melt-processible, and show orientation in the molten state. Compositions filled with about 30 weight percent of glass fibers display heat distortion temperatures (HDT's) of about 240° C. to about 280° C., when measured under a load of 264 psi.

While the overall combination of properties of the above resins is outstanding compared to prior art wholly aromatic polyesters based on p-hydroxybenzoic acid, benzene dicarboxylic acids and hydroquinone, they are preferably used in blends with polyesters made from p-hydroxybenzoic acid, isophthalic and terephthalic acids and 4,4′-biphenol to facilitate moldability and minimize blistering of large molded parts. In addition, these novel blends display improved mechanical properties; composites containing 30 weight percent of glass fibers show heat distortion temperatures (under a load of 264 psi) of at least 240° C. The subject blends are claimed in commonly assigned U.S. patent application of P. Huspeni et al., entitled "Polymer Compositions Having Improved Molding Characteristics", Ser. No. 07/255,632, filed on Oct. 11, 1988, which is hereby incorporated by reference.

Obviously, it is desirable to incorporate many or all of the desirable properties in a single polymer to avoid producing two different polyesters.

We have now found that wholly aromatic polyesters based on five components, i.e., p-hydroxybenzoic acid, isophthalic and terephthalic acids, hydroquinone, and an arylene diol such as 4,4′-biphenol, for example, used in specified proportions, display excellent mechanical properties, good moldability, high melting points and high HDT's, and yield molded parts having very good surface characteristics.

The present discovery was surprising since, with some known exceptions, mixtures of polymeric materials are generally immiscible. That is, they consist of domains of chemically distinct phases. Usually, one component forms a continuous phase, while the other component forms roughly spherical domains as inclusions. Under some circumstances, bi-continuous structures are also obtainable. Hence, a blend of two polymers is usually a two-phase system whose properties reflect those of the two phases present. On the other hand, a random copolymer is a one-phase material wherein the properties of the constituents are averaged. Thus, a copolymer is expected to be quite different from a two-phase blend. Even if the monomers employed to make the component polymers of the blend were to be the same as those employed to make the corresponding random copolymer, one would not expect similar characteristics for the two systems. In addition, the known prior art suggests that one should not be able to find any useful materials in the compositional region of the instant invention. In fact, the prior art teaches away from the compositional ranges of the current invention.

As indicated in application Ser. No. 07/255,670, the prior art has been unsuccessful in replacing biphenol with hydroquinone without sacrificing properties and/or using expensive comonomers. While various references discussed below have suggested employing mixtures of hydroquinone and a second arylene diol, none of these describe the polymers of this invention.

Dicke et al., U.S. Pat. No. 4,603,190 claim five component copolyesters based on terephthalic acid, isophthalic acid, p-hydroxybenzoic acid, hydroquinone and 4,4′-biphenol wherein the terephthalic acid to isophthalic acid ratio is equal to or less than one. The polymers display Vicat B temperatures of about 130° C. to about 150° C., which translate into even lower HDT's. Obviously, the polymers are of no interest in applications which require dimensional stability at high temperatures (e.g. equal to or greater than about 200° C.).

Portugall et al., U.S. Pat. No. 4,751,128 claim similar five component polyesters wherein the molar ratios of terephthalic to isophthalic acids vary from 1.04:1 to 19:1; and wherein the hydroquinone to 4,4'-biphenol molar ratios are in the range of 0.1:1 to 2.67:1. The copolymers appear to have a satisfactory combination of mechanical and thermal properties with HDT's of up to 248° C. The drawback of the materials, however, is their high cost due to the rather low ratio of the inexpensive hydroquinone to the very expensive 4,4'-biphenol. In fact, U.S. Pat. No. 4,751,128 suggests that there are no compositions of interest at hydroquinone to 4,4'-biphenol molar ratios greater than 2.67:1; indeed, according to the patent, it is preferred that the subject ratio be no higher than 2.33:1 (column 2, lines 24–26).

Okamoto et al., European Pat. Application No. 275,324 disclose and claim aromatic polyesters from isophthalic and terephthalic acids, p-hydroxybenzoic acid, hydroquinone, 4,4'-biphenol, and, optionally, a sixth comonomer selected from 2,6-naphthalene diol, or an alkyl- or chloro- substituted hydroquinone. Once again, the mole ratio of hydroquinone to the 4,4'-biphenol is low, i.e. from 1:1 to 1:19. The application states (p. 6) that if the subject ratio is greater than 1:1, "the heat resistance is poor" (line 9, p. 6); while if said ratio is lower than 1:19 the resulting polymers have poor flow characteristics. It is noteworthy, that copolymers with hydroquinone/4,4'-biphenol molar ratios greater than one could not be prepared (see lines 12–17, p. 14; and Table 2, p. 15).

Cottis, et al., U.S. Pat. No. 4,563,508 suggest the possibility of preparing copolyesters from terephthalic and isophthalic acids, p-hydroxybenzoic acid, hydroquinone and 4,4'-biphenol. The patent does not describe, however, any compositions within the scope of this invention.

In summary, therefore, the possibility of preparing polyesters from terephthalic acid, isophthalic acid, p-hydroxybenzoic acid, hydroquinone and an arylene diol such as 4,4'-biphenol, for example; with high molar ratios of hydroquinone/arylene diol (e.g. ≧3:1); having both the desirable thermal, mechanical and molding characteristics as hereinbelow described; and very attractive economics was surprising and totally unexpected. In fact, the teachings of the prior art are contrary to our discoveries.

THE INVENTION

The polyesters of the instant invention are comprised of units (1)–(5):

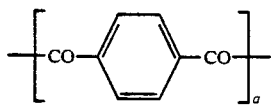 (1)

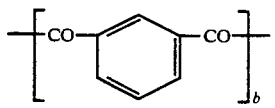 (2)

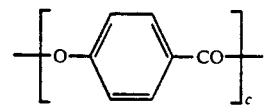 (3)

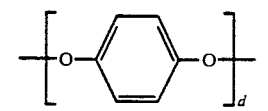 (4)

 (5)

wherein Ar is a divalent substituted mononuclear aromatic radical of the formula

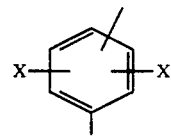

wherein X is independently hydrogen, a $C_1$ to $C_5$ alkyl group, a halide atom, or an aryl group such as phenyl; with the proviso that when the valence bonds are para to each other, at least one group X must be other than hydrogen; and/or a divalent dinuclear aromatic radical of the formula

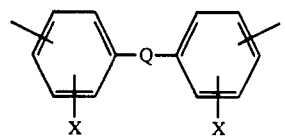

wherein X is as defined above, and Q is selected from the group of O, S, SO, S—S, $SO_2$, CO and a chemical bond; and/or a divalent naphthalene radical of the formula

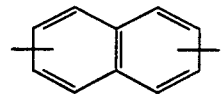

or isomers thereof.

In the formulae (1)–(5) a+b is approximately equal to d+e; the ratio of a to b is in the range of about 1.4:1 to about 10:1; preferably about 1 5:1 to about 5:1; the ratio of d to e is from about 3:1 to about 21:1, preferably from about 3.5:1 to about 20:1; and c is in the range of from about 0.6 to about 7, preferably from about 0.7 to about 4, based on the total moles of a+b.

Arylene diols useful for the purposes of the instant invention are, for example, resorcinol, methylhydroquinone, chlorohydroquinone, t-butylhydroquinone, phenylhydroquinone, the 4,4'-, 4,3'-, and 3,3'-biphenols; the 4,4'-, 4,3'-, and 3,3'-dihydroxydiphenyl ethers; the 4,4'-, 4,3'-, and 3,3'-dihydroxydiphenyl sulfides; the 4,4'-, 4,3'-, and 3,3'-dihydroxydiphenyl sulfoxides; the 4,4'-, 4,3'-, and 3,3'-dihydroxydiphenyl disulfides; the 4,4'-, 4,3'-, and 3,3'-dihydroxydiphenyl sulfones; the 4,4'-, 4,3'-, and 3,3'-dihydroxybenzophenones; and the naphthalene diols; such as the 1,4-, 1,5-, 2,6-, and 2,7-naphthalene diols; the 4,4'-, 4,3'-, and 3,3'-biphenols are preferred.

The subject resins form a stable oriented melt phase at about 260° C. or higher; the melt phase is tractable and can be melt-extruded below its decomposition temperature to form quality high performance fibers, films, molded articles, and the like. Fabricated products show a smooth surface, and a minimal tendency to blister. The polyesters display high modulus and strength, as well as good retention of properties at high temperatures. The polymers have heat distortion temperatures of at least about 200° C., preferably at least about 220° C. when measured under a load of 264 psi.

It is important to point out that melting points and heat distortion temperatures (HDT's) are basic property parameters that determine polymer performance. Thus, a very high melting point results in materials that are either difficult to melt-fabricate or plain intractable. Low melting points lead to resins having low HDT's. Heat distortion temperature values are very important since they indicate the upper temperature at which the particular polymer is useful, especially in structural applications. Closely related important parameters are the crystallization temperature and the rate of crystallization. Both provide an indication of how quickly the molten material develops the desirable crystallinity characteristics.

The heat distortion temperatures were determined by using the ASTM method D-648. Melting points, crystallization temperatures (also referred to as the "onsets of crystallization") and the crystallization rates were measured using X-ray techniques. A brief description follows.

The crystalline melting point is measured by following the intensity of the X-ray reflection of the most intensive peak as a function of temperature. The most intensive diffraction peak is located at a spacing of about 4.5 Å. Based on literature data [J. Polymer Sci., Polym. Chem. Ed., 14. 2207 (1976); J. Polym. Sci., Polym. Chem. Ed., 21, 2249(1983)] the subject peak has been tentatively assigned to the distance between the polymer chains. The point at which the intensity reaches a minimum is taken for the polymer melt temperature. The rate of temperature change is 100° C. per minute.

The onset of crystallization is taken as the temperature at which there is a sharp increase in the intensity of the X-ray peak referred to above. Again, the rate of cooling is 100° C. per minute.

Crystallization rate is defined as the difference between the intensities of the above X-ray peak at the crystallization temperature and at 40° C. below that temperature the rate of cooling being 100° C. per minute.

A detailed description of the three methods is given in the Experimental. Note that throughout this patent, all melting and crystallization data refer to the second heating/cooling cycle of the sample (see Experimental).

A surprising and unexpected feature of the copolyesters of the instant invention is their ability to yield molded materials that display good surface characteristics and a low tendency to blister.

The phenomenon of blistering has been known. Blisters may occur near a surface or in the bulk of the sample. Here, we are mainly concerned with surface blisters; note, however, that small internal blisters or voids can also be detrimental to material performance.

Moldings based on polymers that show orientation in the melt, display skin-core effects. Hence, phenomena observed in these systems are often analogous to those encountered in coatings and composites. In composites, for example, blistering and delamination occur especially between two layers of different composition. In coatings, blistering is known to be a localized delamination at an interface; it depends on the diffusion of chemicals such as water and degradation by-products. The difference in the thermal expansion coefficient between a coating and the substrate can create stresses and may weaken the interface. A blister may then form with less pressure difference due to volatiles, than in cases where these stresses are absent.

In summary thus, blistering is due to a surface layer delamination and can be caused either by trapped volatiles or by built-in stresses. Most probably both factors are at work.

Two types of blistering are encountered with polymeric materials; (1) molding blisters and (2) oven blisters. Blisters which occur during molding generally indicate the presence of degraded material. Quite often parts having acceptable surface characteristics are obtained upon molding. However, when these parts are treated at high temperatures for a certain period of time, blisters ("oven blisters") often appear. These do not necessarily indicate the presence of degraded material as a result of molding.

It is of paramount importance that molding of the polymer does not yield parts having a blistered surface. It should be noted that the configuration of a part is also quite often a factor in mold blistering. In any event, if molding blisters are detected upon visual examination, the part will generally blister to a considerably greater extent when exposed to heat treatment. Thus, the particular molding compound is most probably of inadequate quality. If, on the other hand, a good looking molding part is obtained, there is no assurance as to what the results of "oven testing" will be. For high temperature applications, it is imperative that oven blistering be also either absent or significantly minimized. The oven test and the method of blister rating are described in the "Experimental".

Astonishingly, the copolyesters of the instant invention show a considerably decreased tendency to blister—both during molding and in the oven test.

It is important to point out that the novelty of the instant invention does not reside in the use of novel monomers; the critical factor of the present invention is the discovery that polymers having a combination of outstanding characteristics can be obtained when the five monomers, i.e., p-hydroxybenzoic acid (PHBA), hydroquinone (HQ), an arylene diol, e.g. 4,4'-biphenol (BP), isophthalic acid (IA), and terephthalic acid (TA), are used in the specified ratios. Clearly, (vide supra),the existence of these very interesting materials was not anticipated nor predicted by the existing prior art.

The synthesis of the polyesters of the instant invention is described in detail in Cottis et al., U.S. Pat. No. 3,637,595 entitled "P-Oxybenzoyl Copolyesters" and in Finestone, U.S. Pat. No. 4,742,149 entitled "Production of Melt Consistent Aromatic Polyesters"; the disclosure of the aforementioned two patents is incorporated herein by reference.

The bulk condensation of aromatic polyesters is described in the patent literature and broadly considered involves an alkanoylation step in which a suitable dicarboxylic acid, hydroxybenzoic acid and diol are reacted with an acid anhydride; a prepolymerization step in which the reaction product of the first step is polycondensed to prepare a prepolymer; and the prepolymer is thereafter heated in a third step to produce a polycondensate of the desired degree of polymerization.

Thus, in somewhat greater detail, the instant copolyesters are prepared by charging into the reactor the required amounts of isophthalic and terephthalic acids, p-hydroxybenzoic acid, hydroquinone and an arylene diol such as 4,4'-biphenol. An anhydride of a lower monocarboxylic acid, preferably an anhydride of a $C_2$ to $C_4$ monocarboxylic acid, is added in at least stoichiometric amounts. It is most preferred to use acetic anhydride; its amount is preferably from about 5 to about 20 mole percent over that required for the acetylation of all of the hydroxyl groups. The acetylation reaction takes place at about 140° C. for a period of time of from about 2 to about 6 hours. The reaction mixture is then heated to about 240°-320° C. at a rate of about 20 to about 40° C. per hour, and is kept at about 240 to about 320° C. for approximately a few minutes to about 4 additional hours. The low molecular weight polymer obtained is then solid state advanced to the required high molecular weight by heating to a temperature of from about 280° C. to about 320° C., for a period of from about one to about 24 hours.

A preferred variant as described in Finestone, U.S. Pat. No. 4,742,149, comprises adding a salt, particularly an alkaline earth metal salt or an alkali metal salt, preferably potassium sulfate, during the preparation of the resin and, particularly to the prepolymer melt prior to advancement of the final product to the desired degree of polymerization. The incorporation of stabilizing amounts of phosphites, as described in Cottis, U.S. Pat. No. 4,639,504 is also advantageous.

The polyesters of the present invention commonly exhibit

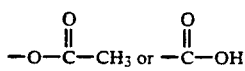

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

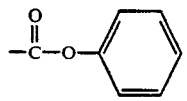

or methyl ester

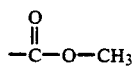

optionally may be included at the end of the polymer chains.

The polymers may be annealed below their melting points for a period of time; or the polymers may be oxidatively crosslinked to at least some degree, if desired, by heating in an oxygen-containing atmosphere (e.g., in air) while in bulk form or as a previously shaped article at a temperature below their melting points for a limited period of time (e.g., for a few minutes).

The polyesters of the present invention tend to be substantially insoluble in all common polyester solvents such as hexafluoroisopropanol and o-chlorophenol, and accordingly are not susceptible to solution processing. They can surprisingly be readily processed by known melt processing techniques as discussed hereafter.

The polyesters of the present invention commonly exhibit weight average molecular weights of about 2,000 to about 200,000, preferably about 10,000 to about 50,000 and most preferably about 20,000 to about 25,000. These molecular weights are determined by techniques that do not involve solutioning of the polymer, e.g., by end-group determination, and the like.

The instant polyesters can be melt processed in the substantial absence of polymer degradation to form a variety of relatively stiff shaped articles, e.g., molded three-dimensional articles, fibers, films, tapes, etc. The polyesters are suitable for molding applications and may be molded via standard injection molding techniques commonly utilized when forming molded articles. Unlike the polyesters commonly encountered in the prior art, it is not essential that more severe injection molding conditions (e.g., higher temperatures), compression molding, impact molding, or plasma spraying techniques be utilized. Fibers or films may be melt extruded. In some instances, as described in Cottis et al., U.S. Pat. No. 4,563,508, melt fabrication may be facilitated by adding flow aids.

Molding compounds may be formed from the subject copolyesters by incorporating therein reinforcing agents and/or fillers. Representative fibers which may serve as reinforcing media include glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wool cellulose fibers, etc. Representative filler materials include calcium silicate, silica, clays, talc, mica, polytetrafluoroethylene, carbon black, graphite, alumina trihydrate, sodium aluminum carbonate, barium ferrite, wollastonite, titanium dioxide, etc. These molding compounds are useful in a variety of applications; for example, in cookware articles, and the like.

The polymers of this invention may contain up to 10 mole percent (based on total reactants) of carbonate linkages and/or comonomers other than (1)-(5), provided that the use of said carbonate linkages and/or comonomers does not unfavorably affect the very attractive properties of the instant copolyesters, i.e., (1) melt processibility below the decomposition temperature; (2) a melting point of at least about 260° C.; (3) an HDT of at least about 200° C. when measured under a load of 264 psi using the method described in ASTM D-648; and (4) the ability to form molded articles having good surface characteristics and a decreased tendency to blister.

In fact, present indications are that in addition to copolymerizing the system TA/IA/PHBA/HQ with 4,4'-biphenol it is also possible to achieve the results of this invention by substituting 2-hydroxy-6-naphthoic acid for a portion of the PHBA or by substituting phenylhydroquinone, tert-butylhydroquinone, chlorohydroquinone or a dihydroxynaphthalene for a portion of HQ; or by substituting 2,6-naphthalenedicarboxylic acid or 4,4'-biphenyldicarboxylic acid for a portion of the TA or IA, thereby alleviating the need for 4,4'-biphenol as a fifth component.

EXAMPLES

The following examples serve to give specific illustrations of the practice of this invention but they are not intended in any way to limit the scope of this invention.

A. Experimental Procedures

The following procedures were used to obtain the data given in the examples.

A.1. X-ray Measurements (a) Apparatus

X-ray diffraction data were obtained using a Philips XRG-3000 X-ray generator equipped with a vertical diffractometer, a long, fine focus copper X-ray tube, a Paar HTK-10 high temperature diffractometer attachment and a Paar HTK-Heat Controller. Diffractometer position is controlled by computer, which also measures and records radiation count rate produced by sample crystallinity and sample temperature.

b) Determination of the Polymer Melting Point

A sample of the polymer is submitted to a preliminary X-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Ångstroms d-spacing) reaches its minimum value, i.e., an approximate melting point. A second-degree polynomial equation is derived from the above data; this polynomial equation now allows to follow the peak angle as the sample temperature is varied. The temperature at which the peak height reaches a minimum (i.e., touches the baseline) is considered to be the melting point. The polymer sample is now heated and cooled at a rate of 100° C. per minute between the previously-mentioned temperature limits, and its melting point is determined. Since the melting point of a crystalline material often changes on heating and cooling (due to recrystallization, further polymerization, etc.) the sample is cooled and reheated. This allows determination of the melting point on the second heating cycle. Generally, the second cycle yields a melting point which remains approximately constant if additional heating or cooling cycles are performed. Therefore, the value obtained in the second heating cycle is taken as the polymer melting point.

c. Crystallization Temperature Onset of Crystallization)

The onset of crystallization is measured in the same manner except that the scanning (for details, see above), is performed while the sample is cooled at 100° C. per minute. The temperature at which the peak emerges from the baseline during the second cooling cycle is considered as the onset of crystallization.

d. Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chosen. Rates of crystallization are expressed as the increase in counts per minute for a sample cooled within these temperature limits during the second cooling cycle.

A.2. Blister Rating

Samples to be tested are preconditioned at 20°-25° C., 50±5 percent relative humidity, for 24 hours. Test sample lot normally includes 5 tensile bars (⅛" thick), 5 HDT bars (5"×½"×¼" thick) and 5 flex bars (5"×½"×⅛" thick). The samples are carefully inspected and any existing cracks and/or blisters are circled. The samples are then annealed in an oven which has been equilibrated at 232° C. (450° F.), for a period of four hours. They are then removed, cooled and inspected. Rating codes follow:

0-no new blisters;
1- very slight blistering (one or two very small blisters);
2- slight blistering (three to six small blisters);
3-moderate blistering (a few large blisters and/or many small blisters); and
4- heavy blistering (many large or small blisters covering more than half of the specimen surface).

The numerical blister rating is calculated using the equation $$R = \frac{1}{n} \sum_{i=1}^{n} X_i^2$$

where
R = numerical blister rating (0-16)
n = number of samples tested
$X_i$ = blister rating of sample i (0-4).

In the above calculation the individual ratings for the entire set of test samples (tensile bars, HDT bars, flex bars) are generally treated as a single population. The ratings vary within the range of 0 (no blistering) to 16 (severe blistering, worst case).

A.3 Miscellaneous

The flexural strength and the flexural modulus of the experimental samples were measured according to the procedure of ASTM D-790-84A; HDT (DTUL) data were obtained using the method described in ASTM D-648.

EXAMPLES

Example 1

This is an example of the synthesis of a novel polyester based on terephthalic acid, isophthalic acid, p-hydroxybenzoic acid, hydroquinone, and 4,4'-biphenol in the nominal mole ratio of 0.615:0.385:0.750:0.9:0.1

The following ingredients were combined in the manner described.

| Item | Ingredient | Amount |
|------|------------|--------|
| A | Terephthalic acid | 4.838 Kg |
| B | Isophthalic acid | 3.029 Kg |
| C | p-Hydroxybenzoic acid | 4.905 Kg |
| D | Hydroquinone | 4.693 Kg |
| E | 4,4'-Biphenol | 0.882 Kg |
| F | Acetic Anhydride | 15.295 Kg |
| G | Magnesium acetate tetrahydrate | 7.056 gram |

Items A through G were charged to a 15 gallon, oil heated vessel equipped with an anchor type stirrer, reflux condenser, after condenser, and distillate receiver.

After purging with nitrogen, the contents were heated with stirring to 141° C. and held under reflux at that temperature for 3 hours. Distillation was then started while increasing the temperature over a 6.7 hour period to 275° C. The contents of the vessel were transferred to a sigma blade mixer that had been preheated to 305° C. After mixing for 5 hours at this temperature under an atmosphere of nitrogen, the mixer was cooled to near room temperature at which point the polymer was removed as a granular solid. The yield was 15.2 Kg (95% of theoretical). Examination by X-ray diffraction showed a melting temperature of 369° C., crystallization temperature of 314° C. and a crystallization rate of 560 counts per minute.

A sample of the polymer was pelletized and molded by standard techniques. The test specimens had a Heat Distortion Temperature of 268° C., a room temperature late was collected. The hot mixture was then poured into an aluminum pan to cool to a brittle sheet. The material was then pulverized to a granular powder fine enough to pass a 2 mm screen. The powder was heated up slowly (22° C. per hour) under nitrogen to 300° C. and held for 4 hours at that temperature.

|  | Example Number | | | | | | | | | |
|---|---|---|---|---|---|---|---|---|---|---|
|  | 6 | | 7 | | 8 | | 9 | | 10 | |
| Item | Mole Ratio | Wt gms | Mole Ratio | Wt gms | Mole Ratio | Wt gms | Mole Ratio | Wt gms | Mole Ratio | Wt gms |
| A | 0.6075 | 205.9 | 0.6150 | 196.1 | 0.6225 | 187.3 | 0.6300 | 179.5 | 0.6375 | 165.9 |
| B | 0.3925 | 133.0 | 0.3850 | 122.7 | 0.3775 | 113.6 | 0.3700 | 105.4 | 0.3625 | 94.3 |
| C | 0.6250 | 176.1 | 0.7500 | 198.8 | 0.8750 | 218.9 | 1.0000 | 236.9 | 1.1250 | 243.4 |
| D | 0.9500 | 213.4 | 0.9000 | 190.2 | 0.8500 | 169.5 | 0.8000 | 151.1 | 0.7500 | 129.4 |
| E | 0.05 | 19.0 | 0.1000 | 35.7 | 0.1500 | 50.6 | 0.2000 | 63.9 | 0.2500 | 72.9 |
| F | — | 587.5 | — | 581.2 | — | 575.6 | — | 570.5 | — | 565.9 |
| G | — | 0.2682 | — | 0.2682 | — | 0.2682 | — | 0.2682 | — | 0.2682 |
| Hydroquinone/ 4,4'-biphenol (mole ratio) | 19:1 | | 9:1 | | 5.6:1 | | 4:1 | | 3:1 | | flexural strength of 28,000 psi, and a room temperature flexural modulus of 2,460,000 psi. The blister rating was excellent at 1.5.

A molding composition containing 70 weight percent of the above polymer and 30 weight percent of milled glass fiber was prepared by compounding on a twin screw extruder and molded into test specimens. The heat distortion temperature (ASTM D-648) was 265° C. The room temperature flexural strength and modulus (psi) were 27,200 and 2,240,000 respectively.

Examples 2 to 5

Items identified in example 1 were the same for the following examples. The polymerization procedure was the same as in example 1; the amounts of ingredients are shown below.

Crystallinity data of the examples above are summarized in Table I.

TABLE 1

| | Crystallinity Data | | | |
|---|---|---|---|---|
| Example No. | NQ/[1] -BP(molar ratio) | Tm (°C.) | Onset of Crystallization (°C.) | Rate of Crystallization (counts/minute) |
| 1 | 9:1 | 369 | 314 | 560 |
| 2 | 19:1 | 375 | 319 | 1216 |
| 4 | 19:1 | 406 | 351 | 3052 |
| 5 | 3:1 | 398 | 372 | 3000 |
| 6 | 19:1 | 318 | 306 | 790 |
| 7 | 9:1 | 306 | 291 | 789 |
| 8 | 5.6:1 | 297 | 281 | 560 |
| 9 | 4:1 | 298 | 268 | 616 |
| 10 | 3:1 | 261 | 258 | 483 |

[1]HQ = hydroquinone; BP = 4,4'-biphenol.

|  | Example Number | | | | | | | |
|---|---|---|---|---|---|---|---|---|
|  | 2 | | 3 | | 4 | | 5 | |
| Item | Mole Ratio | Wt Kg | Mole Ratio | Wt Kg | Mole Ratio | Wt Kg | Mole Ratio | Wt Kg |
| A | 0.585 | 4.654 | 0.850 | 6.468 | 0.585 | 2.573 | 0.850 | 3.647 |
| B | 0.415 | 3.302 | 0.150 | 1.141 | 0.415 | 1.825 | 0.150 | 0.644 |
| C | 0.750 | 4.961 | 0.750 | 4.745 | 3.000 | 10.971 | 3.000 | 10.701 |
| D | 0.950 | 5.010 | 0.750 | 3.783 | 0.950 | 2.769 | 0.750 | 2.133 |
| E | 0.050 | 0.446 | 0.250 | 2.132 | 0.050 | 0.246 | 0.250 | 1.202 |
| F | — | 15.468 | — | 14.787 | — | 15.540 | — | 15.159 |
| G | — | 0.007 | — | 0.007 | — | 0.007 | — | 0.007 |
| Hydroquinone/ 4,4'-biphenol (mole ratio) | 19:1 | | 3:1 | | 19:1 | | 3:1 | |
| Blister rating (neat polymer) | — | | — | | 10.6 | | 9 | |
| Blister rating (30 wt % glass fiber filled polymer) | — | | — | | 8.5 | | 3.8 | |

Examples 6 to 10

The ingredients are identified as items A through G in example 1. These ingredients, in the amounts shown in the table below, were charged to a two liter resin kettle fitted with a heating mantle, mechanical stirrer, reflux condenser, and distillate take-off apparatus. The mixture was heated to reflux and stirred for three hours. Distillation was then started and the temperature of the reaction mixture increased at the rate of 30° C. per hour until approximately 97 percent of the theoretical distil- The data in Table 1 indicate that good high temperature performance is obtained even at very high HQ/BP molar ratios. Contrary to the statement of the European Pat. Application EP 275,324 that at molar ratios of HQ/BP higher than 1:1 "the heat resistance is poor", the melting points of the copolyesters actually have a tendency to increase with the increase of the hydroquinone content. This, in turn, indicates better (not poorer) heat resistance. Also, no experimental problems were encountered in preparing the copolyesters of the instant invention.

Comparative Example 1

This example shows the molding characteristics (blister formation) of a wholly aromatic polyester based on four components, i.e isophthalic acid/terephthalic acid/p-hydroxybenzoic acid/hydroquinone in the nominal mole ratio of 0.4:0.6:0.5:1.0.

The following ingredients were combined in a manner described:

| Item | Ingredient | Amount |
|---|---|---|
| A | Terephthalic acid | 5.311 Kg |
| B | Isophthalic acid | 3.541 Kg |
| C | p-Hydroxybenzoic acid | 3.680 Kg |
| D | Hydroquinone | 5.868 Kg |
| E | Acetic anhydride | 15.645 Kg |
| F | Magnesium acetate tetrahydrate | 0.46 gram |
| G | Triphenyl phosphite | 7.36 gram |

Items A through F were charged into a 15-gallon, oil heated vessel equipped with an anchor type stirrer, reflux condenser, after condenser, injection port and distillate receiver. After purging with nitrogen, the contents were heated with stirring to 141° C. and held under reflux at that temperature for 3 hours. Distillation was then started while increasing the temperature over a 4.8 hour period to 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

The melting point of the polymer (X-ray) was 359° C.; its crystallization temperature was 336° C. with a crystallization rate of 2400. The material was pelletized and molded into standard test specimens having a blister rating of 15.

What is claimed is:

1. A wholly aromatic polyester comprising the units (1)–(5)

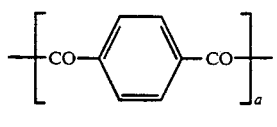 (1)

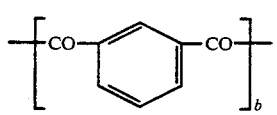 (2)

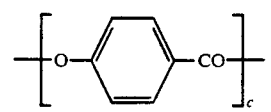 (3)

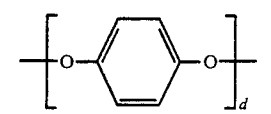 (4)

 (5)

wherein Ar is at least one member selected from a divalent substituted mononuclear aromatic radical of the formula

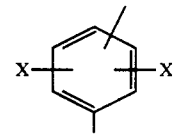

wherein X is independently hydrogen, a $C_1$ to $C_5$ alkyl group, a halide atom or an aryl group; with the proviso that when the valence bonds are para to each other at least one group X must be other than hydrogen; a divalent dinuclear aromatic radical of the formula

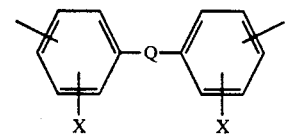

wherein X is as previously defined and Q is at least one member selected from the group consisting of a chemical bond O, S, SO, S—S, $SO_2$, and CO; and a divalent naphthalene radical of the formula

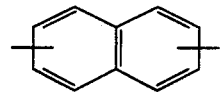

or isomers thereof
and wherein a+b is approximately equal to d+e; the ratio of a to b being in the range of from about 1:4:1 to about 10:1; the ratio of d to e being in the range of from about 4:1 to about 21:1; and c being in the range of from about 0.6 to about 7, based on the total number of moles of a+b.

2. A wholly aromatic polyester as defined in claim 1 which has a melting point of at least about 260° C., a heat distortion temperature of at least about 200° C. when measured under a load of 264 psi, and which yields molded articles having good surface characteristics.

3. A process for preparing the polyester of claim 1 which comprises reacting terephthalic acid, isophthalic acid, p-hydroxybenzoic acid, hydroquinone, and an arylene diol with an anhydride of a lower monocarboxylic acid to form a prepolymer; followed by solid state advancement of said prepolymer to the desired high molecular weight polyester.

4. A wholly aromatic polyester as defined in claim 1 wherein the group Ar consists essentially of biphenylene.

5. A wholly aromatic polyester as defined in claim 1 wherein the group Ar consists essentially of at least one member selected from

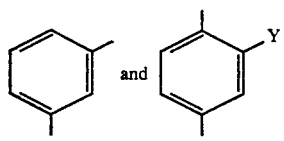

wherein Y is methyl, chlorine, t-butyl or phenyl.

6. A wholly aromatic polyester as defined in claim 1 wherein the group Ar consists essentially of at least one member selected from

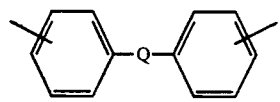

wherein Q is either a chemical bond or is selected from O, S, SO, S—S, S$o_2$—, and CO.

7. A wholly aromatic polyester as defined in claim 1 wherein the group Ar consists essentially of at least one member selected from

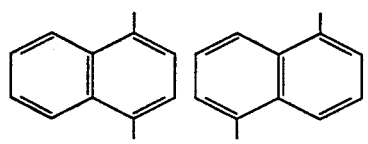

8. A wholly aromatic polyester comprising the units (1), (2), (3), (4) and (6)

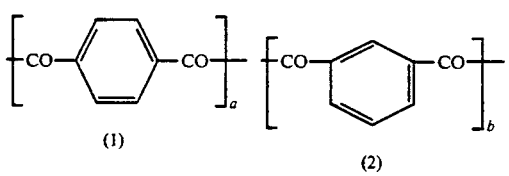

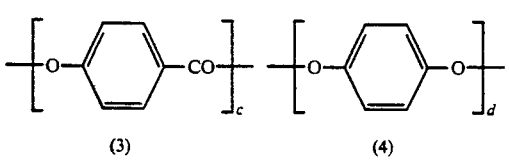

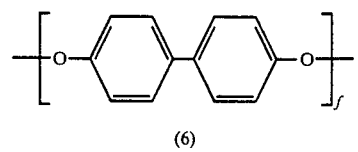

(6)

wherein a+b is approximately equal to d+f; the ratio of a to b being in the range of from about 1.4:1 to about 10:1; the ratio of d to f being in the range of from about 4:1 to about 21:1; and c being in the range of from about 0.6 to about 7 based on the total moles of a+b.

9. A wholly aromatic polyester consisting essentially of the units (1), (2), (3), (4), and (6)

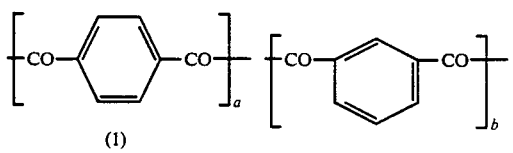

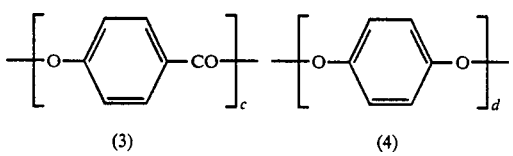

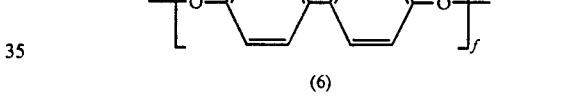

(6)

wherein a+b is approximately equal to d+f; the ratio of a to b being in the range of from about 1.4:1 to about 10:1; the ratio of d to f being in the range of from about 4:1 to about 21:1: and c being in the range of from about 0.6 to about 7 based on the total moles of a+b.

10. A molding compound formed from the copolyester of claim 1 by incorporating therein one or more reinforcing agents or fillers selected from the group consisting of glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wool cellulose fibers, calcium silicate, silica, clays, talc, mica, polytetrafluoroethylene, carbon black, graphite, alumina trihydrate, sodium aluminum carbonate, barium ferrite, wollastonite and titanium dioxide.

11. Cookware fabricated from the molding compound as defined in claim 10.

* * * * *

UNITED STATES PATENT AND TRADEMARK OFFICE
CERTIFICATE OF CORRECTION

PATENT NO. : 5,066,767
DATED : November 19, 1991
INVENTOR(S) : Markus Matzner; Richard Layton It is certified that error appears in the above-indentified patent and that said Letters Patent is hereby corrected as shown below:

Column 4, line 43, "15:1 to about 5:1" should read --1.5:1 to about 5:1 --.

Signed and Sealed this

Eighth Day of February, 1994

*Attest:*

BRUCE LEHMAN

*Attesting Officer*     *Commissioner of Patents and Trademarks*